United States Patent
Fujikawa et al.

(10) Patent No.: US 7,504,994 B2
(45) Date of Patent: Mar. 17, 2009

(54) RADAR DEVICE AND SIMILAR DEVICE

(75) Inventors: Takumi Fujikawa, Nishinomiya (JP); Takehiro Yamashita, Nishinomiya (JP); Sae Takemoto (Shibata), Nishinomiya (JP)

(73) Assignee: Furuno Electric Company Limited, Nishinomiya City (JP)

( * ) Notice: Subject to any disclaimer, the term of this patent is extended or adjusted under 35 U.S.C. 154(b) by 295 days.

(21) Appl. No.: 10/559,127

(22) PCT Filed: May 24, 2004

(86) PCT No.: PCT/JP2004/007422

§ 371 (c)(1),
(2), (4) Date: Dec. 1, 2005

(87) PCT Pub. No.: WO2004/109322

PCT Pub. Date: Dec. 16, 2004

(65) Prior Publication Data

US 2006/0145914 A1   Jul. 6, 2006

(30) Foreign Application Priority Data

Jun. 2, 2003 (JP) .............................. 2003-157377

(51) Int. Cl.
*G01S 7/298* (2006.01)
*G01S 7/531* (2006.01)
(52) U.S. Cl. ............................ 342/185; 342/189; 367/7
(58) Field of Classification Search ................. 342/185
See application file for complete search history.

(56) References Cited

U.S. PATENT DOCUMENTS 4,439,765 A * 3/1984 Wilmot ....................... 342/58
4,443,797 A * 4/1984 Cramp et al. ............... 342/185
4,829,308 A * 5/1989 Tol et al. .................... 342/185
5,097,268 A * 3/1992 Bauer et al. ................. 342/160
5,351,055 A * 9/1994 Fujikawa et al. ............ 342/184
6,198,429 B1   3/2001 Fujikawa et al.

(Continued)

FOREIGN PATENT DOCUMENTS

JP   11-94930 A   4/1999

(Continued)

*Primary Examiner*—Thomas H Tarcza
*Assistant Examiner*—Matthew M Barker
(74) *Attorney, Agent, or Firm*—Birch, Stewart, Kolasch & Birch, LLP (57) ABSTRACT

There is configured a radar or similar device that outputs received data that is currently being received and scan correlated image data in parallel with each other. Scan correlated image data and display image data resulting from received data from a display video memory 13 are input into a transitional data generator 11, and the transitional data generator 11 generates transitional data that represents an intermediate value and gradually changes from the received data into the scan correlated image data, using these signals, and inputs the transitional data into a selector 12. The received data, a FIRST or a LAST signal, and the transitional data are input into the selector 12, and the selector 12 outputs the received data if FIRST=1, and outputs the transitional data if FIRST=0, to the display video memory 13. This image data is fed back to the transitional data generator 11, and therefore it gradually changes from the received data into the scan correlated image data.

4 Claims, 9 Drawing Sheets

U.S. PATENT DOCUMENTS 6,424,292 B1 * 7/2002 Fujikawa et al. ............ 342/185
6,441,775 B1 * 8/2002 Fujikawa et al. ............ 342/185

FOREIGN PATENT DOCUMENTS

| | | | |
|---|---|---|---|
| JP | 11-352212 A | 12/1999 | |
| JP | 2001-208829 A | 8/2001 | |
| JP | 2002-62349 A | 2/2002 | |

* cited by examiner

RADAR DEVICE AND SIMILAR DEVICE

TECHNICAL FIELD

The present invention relates to radar devices, sonar devices and the like for converting sensed signals received in a polar coordinate system into a rectangular Cartesian coordinate system and outputting them on a display unit, and more particularly to devices for outputting results of scan correlation processing for sensed targets.

BACKGROUND ART

A marine radar device transmits electromagnetic waves from a radar antenna, converts received data in a polar coordinate system that has been obtained from the electromagnetic waves reflected by a target into a Cartesian coordinate system, stores the data in a video memory, and then displays it on a display unit by a raster scanning method. Here, the received data may not always contain only components reflected by a desired target, but it may also contain unnecessary components resulting from sea clutter and the like (hereinafter, this is referred to as "clutter"). For this reason, conventional radar devices have a scan correlation processing function of repeatedly performing a correlation between the current received data obtained during one rotation of the radar antenna, and previous scan correlated data. By performing this process, it is possible to eliminate momentary data such as clutter, thus displaying only the received data from a desired target.

The structure of a conventional radar device performing such a scan correlation process will be described with reference to FIG. 9.

Figure 9:
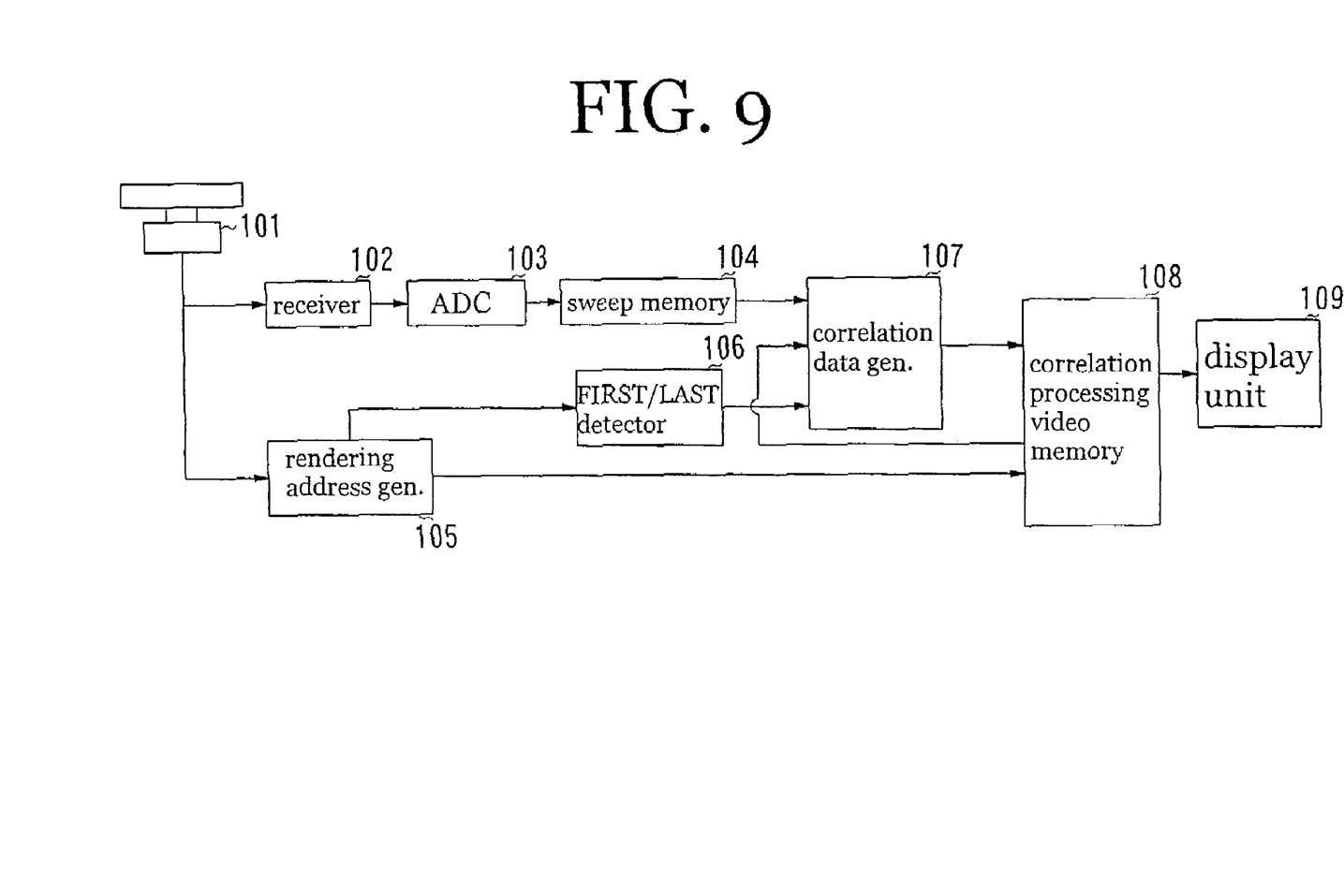
FIG. 9 is a block diagram showing the configuration of the main part of a conventional radar device.

FIG. 9 is a block diagram showing the main part of a conventional radar device provided with scan correlation processing. While rotating through the horizontal plane at a predetermined rotation period, a radar antenna 101 sends out pulses of radio waves and receives, in a polar coordinate system, radio waves reflected by a target, at a predetermined send/receive period. It then outputs the received signal to a receiver 102, and outputs sweep angle data to a rendering address generator 105. The receiver 102 detects and amplifies the received signal from the radar antenna 101, and outputs it to an A/D converter 103. The A/D converter 103 converts this analog received signal into a digital signal (received data) constituted by a plurality of bits. A sweep memory 104 stores in real time the digitized received data for one sweep, and outputs this data for one sweep to a correlation data generator 107 before the received data obtained by the next send process is written again.

Figure 2:
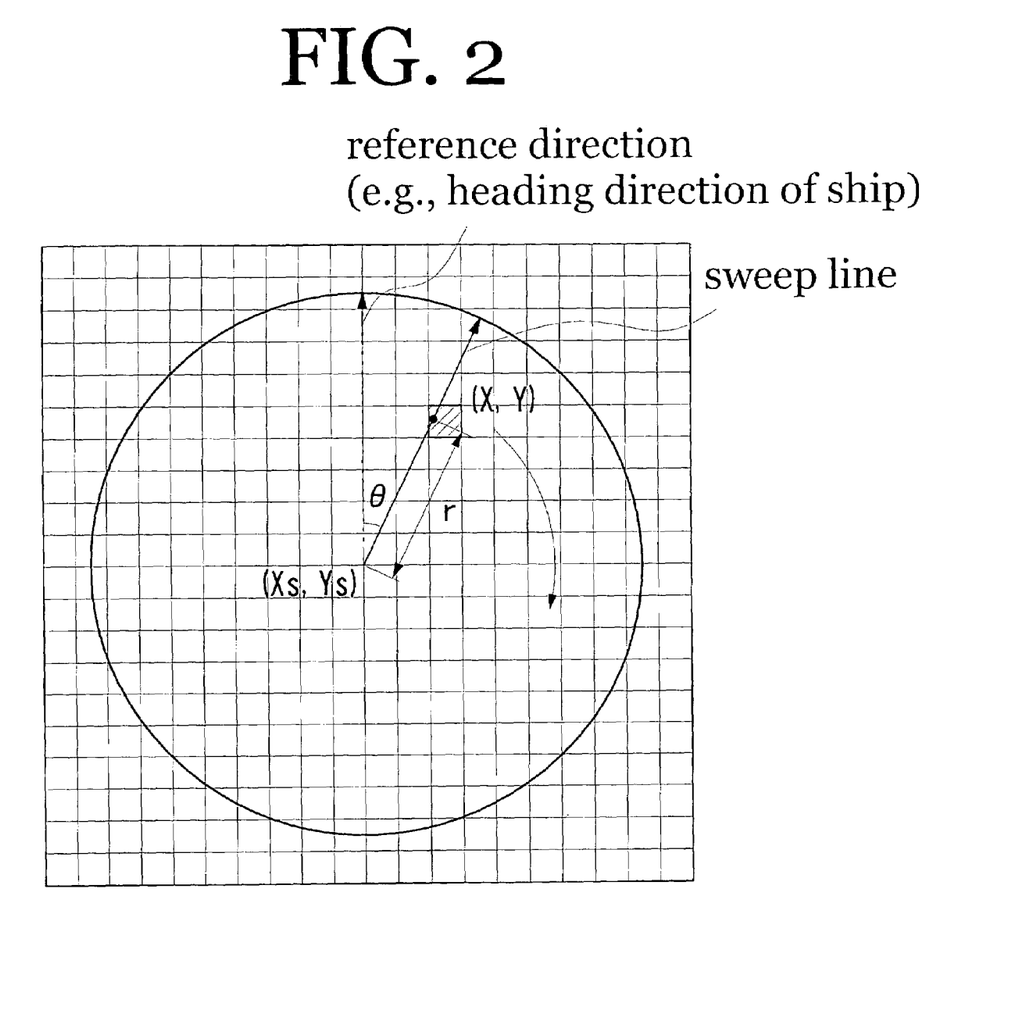
FIG. 2 is a diagram illustrating a radial rendering address.

As shown in FIG. 2, the rendering address generator 105 generates addresses specifying pixels in the video memory, arranged in a corresponding Cartesian coordinate system, from the antenna angle θ (taking a predetermined direction, for example, the heading direction of a ship, as a reference) and the read-out position r of the sweep memory 104, taking the sweep rotation center as the start address and going around from the center. Specifically, the rendering address generator 105 is constructed by hardware that performs operations in accordance with the following equations:

$X = Xs + r \cdot \sin\theta$ $Y = Ys + r \cdot \cos\theta$ where X, Y: address specifying a pixel in the video memory
Xs, Ys: center address of sweep
r: distance from center
θ: angle of sweep (antenna)

A FIRST/LAST detector 106 detects the timing at which, in one sweep rotation (of the radar antenna 1), this sweep has first accessed or last accessed each pixel in the rectangular Cartesian coordinate system set in the rendering address generator 105 on a correlation processing video memory 108, and feeds one of those timings to a correlation data generator 107. Since it is necessary to limit the update of each pixel in the scan correlation processing video memory to once per sweep rotation, a FIRST signal or a LAST signal is used as this timing.

Based on the FIRST signal (or LAST signal) that is input from the FIRST/LAST detector 106, the correlation data generator 107 performs a scan correlation process using received data input from the sweep memory 104 and image data stored in the later-described correlation processing video memory 108 one sweep rotation before, and lets the correlation processing video memory 108 store the data again.

Here, for example, when the received data input from the sweep memory 104 is taken as N(t) and the correlated image data at the pixel position corresponding to the received data that has been obtained up to the previous rotation and that has been input from the correlation processing video memory 108 is taken as W(t−1), the scan correlation process calculates the correlated image data W(t) obtained in the current sweep using the following equation:

$W(t) = \alpha \cdot N(t) + \beta \cdot W(t-1)$ where α and β are any suitable numbers. The details of the scan correlation process can be changed by varying the values of α and β.

The correlation processing video memory 108 has sufficient capacity to store the received data (correlated image data) for one sweep rotation (of the radar antenna 1), and feeds back the correlated image data obtained one rotation before to the correlation data generator 107, for the purpose of the scan correlation process. Further, when a display unit 109 performs raster scanning under the control of a display controller (not shown), the correlation processing video memory 108 outputs the correlated image data in synchronization with this raster scanning. Here, by varying the brightness, the display color or the like in accordance with the data value of each pixel of the correlated image data, the operator can recognize the position, movement and the like of a target using this scan correlated image (e.g., see JP H11-352212A).

However, for the conventional radar device performing scan correlation processing, adjustment of GAIN, STC, FTC and the like during scan correlation requires a time corresponding to several rotations (depending on the values of α and β) of the above-described radar antenna until the result of adjustment is reflected by the images. During this time, it is difficult for the operator to determine an optimum amount of the adjustment, thus increasing the time required for the adjustment and making the adjustment difficult.

In addition, switching from a display with a raw received signal, which has not been subjected to the scan correlation process, to a display with scan correlated image data also requires a time corresponding to several rotations of the antenna, and therefore deficiencies as described above arise. Furthermore, when the details of the selected scan correlation process are not appropriate, there may be cases where images that should be suppressed are highlighted, and, conversely, images that should be highlighted are suppressed. Determining such a state and changing the process details to be optimum also requires a predetermined time as described above.

Moreover, the details of the scan correlation process are different for other ships moving at high speed and for stationary targets such as the seashore, so that the image of other ships moving at high speed may be suppressed when the details of the scan correlation process are set so as to highlight stationary targets. That is, moving targets are suppressed when stationary targets are highlighted, and conversely, stationary targets are suppressed when moving targets are highlighted.

It is an object of this invention to provide a radar or similar device with which a desired image can be promptly observed by making an image resulting from the currently received data that has not been subjected to scan correlation to gradually become similar to an image that has been subjected to scan correlation, or by making an image that has been subjected to a given scan correlation process to gradually become similar to an image that has been subjected to a different scan correlation process.

It is also an object of this invention to provide a radar or similar device with which a desired image can be promptly obserbed, for example, by outputting the currently received data and the scan correlated image data in parallel with each other, or by outputting two sets of image data that have been subjected to scan correlation processes with different details, in parallel with each other.

DISCLOSURE OF INVENTION

A radar or similar device according to this invention includes:

a scan correlation processing section for performing correlation processing between pixel data of current received data obtained by sweep rotation and stored previous data of the pixel data and generating scan correlated data; and a transitional image data generating section into which the received data and the scan correlated data are input, and which outputs the received data as image data at a predetermined timing in one sweep rotation, generates transitional data that represents an intermediate value between the received data and the scan correlated data, based on the received data and the scan correlated data, and outputs the transitional data as image data, at a time period other than the predetermined timing.

With this configuration, the timing at which received data in a polar coordinate system first accesses or last accesses each pixel area in a Cartesian coordinate system in the video memory is detected, and this timing signal is input into the scan correlation processing section and to the transitional image data generation section. Based on this timing signal, the scan correlation processing section uses the current received data and previous scan correlated image data that has already been stored to generate current scan correlated image data, and updates the previous scan correlated data. Raw received data that has been input and the scan correlated image data are input into the transitional image data generation section. In one sweep (antenna) rotation, the transitional image data generation section selects the raw received data if the timing signal is input, and writes it in the video memory with a later-described radial rendering address. In a time period in which the timing signal is not input, it generates transitional data that represents an intermediate state between the image data resulting from this received data and the scan correlated image data, using the scan correlated image data and the received data, and writes this into the video memory with a later-described raster rendering address. In parallel with these overwriting operations, the transitional image data generation section reads out the transitional data in synchronization with scanning performed by the display unit, and displays this data as an image on the display unit. The generation of this transitional data is repeatedly performed until the next timing signal is input for the corresponding pixel. Consequently, the display unit displays an image in which the raw received data gradually changes into the scan correlated image data as time passes.

Furthermore, a radar or similar device according to this invention includes:

first and second scan correlation processing sections for performing correlation processing between pixel data of current received data obtained by sweep rotation and stored previous data of the pixel data and generating scan correlated data; and a transitional image data generating section into which first scan correlated data generated by the first scan correlation processing section and second scan correlated data generated by the second scan correlation processing section are input, and which outputs the second scan correlated data as image data at a predetermined timing in one sweep rotation, generates transitional data that represents an intermediate value between the first and the second scan correlated data, based on the first and the second scan correlated data, and outputs the transitional data as image data, at a time period other than the predetermined timing.

With this configuration, the timing at which the received data in a polar coordinate system first accesses or last accesses each pixel area in a Cartesian coordinate system in the video memory is detected, and this timing signal is input into the first and second scan correlation processing sections and the transitional image data generation section. Based on this timing signal, each of the first and second scan correlation processing sections uses the current received data and previous scan correlated image data that has already been stored to generate current scan correlated image date, and stores this data to update the previous scan correlated image data. Input into the transitional image data generation section are the first scan correlated image data input from the first scan correlation processing section and the second scan correlated image data input from the second scan correlation processing section. In one sweep (antenna) rotation, the transitional image data generation section selects the second scan correlated image data if the timing signal is input, and writes this in the video memory with the later-described radial rendering address. In a time period in which the timing signal is not input, it generates transitional data that represents an intermediate state between the second scan correlated image data and the first scan correlated image data, using the first scan correlated image data and the second scan correlated image data, and writes the transitional data into the video memory with the later described raster rendering address. In parallel with these overwriting operations, the transitional image data generation section reads out the transitional data in synchronization with scanning performed by the display unit, and displays this data as an image on the display unit. The generation of this transitional data is repeatedly performed until the next timing signal is input for the corresponding pixel. Consequently, the display unit displays an image in which the second scan correlated image data gradually changes into the first scan correlated image data as time passes.

Furthermore, in the radar or similar device according to this invention, the first scan correlation processing section outputs the received data without performing scan correlation processing.

With this configuration, when the above-described second scan correlated image data changes into the first scan correlated image data, this first scan correlated image data is the received data, so that substantially an image in which the second scan correlated image data gradually changes into the received data is displayed.

Furthermore, in the radar or similar device according to this invention, the transitional image data generation section includes an adder-subtracter or a multiplier, and addition/subtraction or multiplication is used for calculation for generating the transitional data.

With this configuration, the calculation for generating the transitional data is performed with an adder-subtracter or multiplier with a simple configuration, so that the calculation for generating the transitional image data can easily be performed.

Furthermore, in the radar or similar device according to this invention, the transitional image data generation section concurrently generates and stores a plurality of sets of the transitional data.

With this configuration, since a plurality of sets of the transitional data are concurrently generated and stored, the transitional data can be generated and stored at a higher speed, thus increasing the number of the transitional data sets that are generated and stored during one antenna rotation.

With the radar or similar device according to this invention, the display unit displays an image in which, during one sweep rotation, raw received data gradually changes into scan correlated image data as time passes, and it is therefore possible to simultaneously observe a target in a raw state that has not been subjected to the scan correlation process, and the target in a desired state that has been subjected to the scan correlation process. Moreover, it is possible to easily and promptly confirm whether the set details of the scan correlation process are appropriate by simultaneously observing received data, scan correlated image data and transitional data that represents an intermediate value between the received data and the scan correlated image data. Furthermore, it is possible to readily adjust the details of the scan correlation process, while observing these sets of data. Still further, with the radar or similar device according to this invention, the display unit displays an image in which the second scan correlated image data gradually changes into the first scan correlated image data as time passes, and therefore, it is possible to concurrently observe a stationary target such as a buoy and another ship moving at high speed on the same display screen if the details of the scan correlation processes for these targets are set to be different.

BEST MODE FOR CARRYING OUT THE INVENTION

A radar device according to a first embodiment of the present invention will be described with reference to FIG. 1 to FIG. 6.

Figure 1:
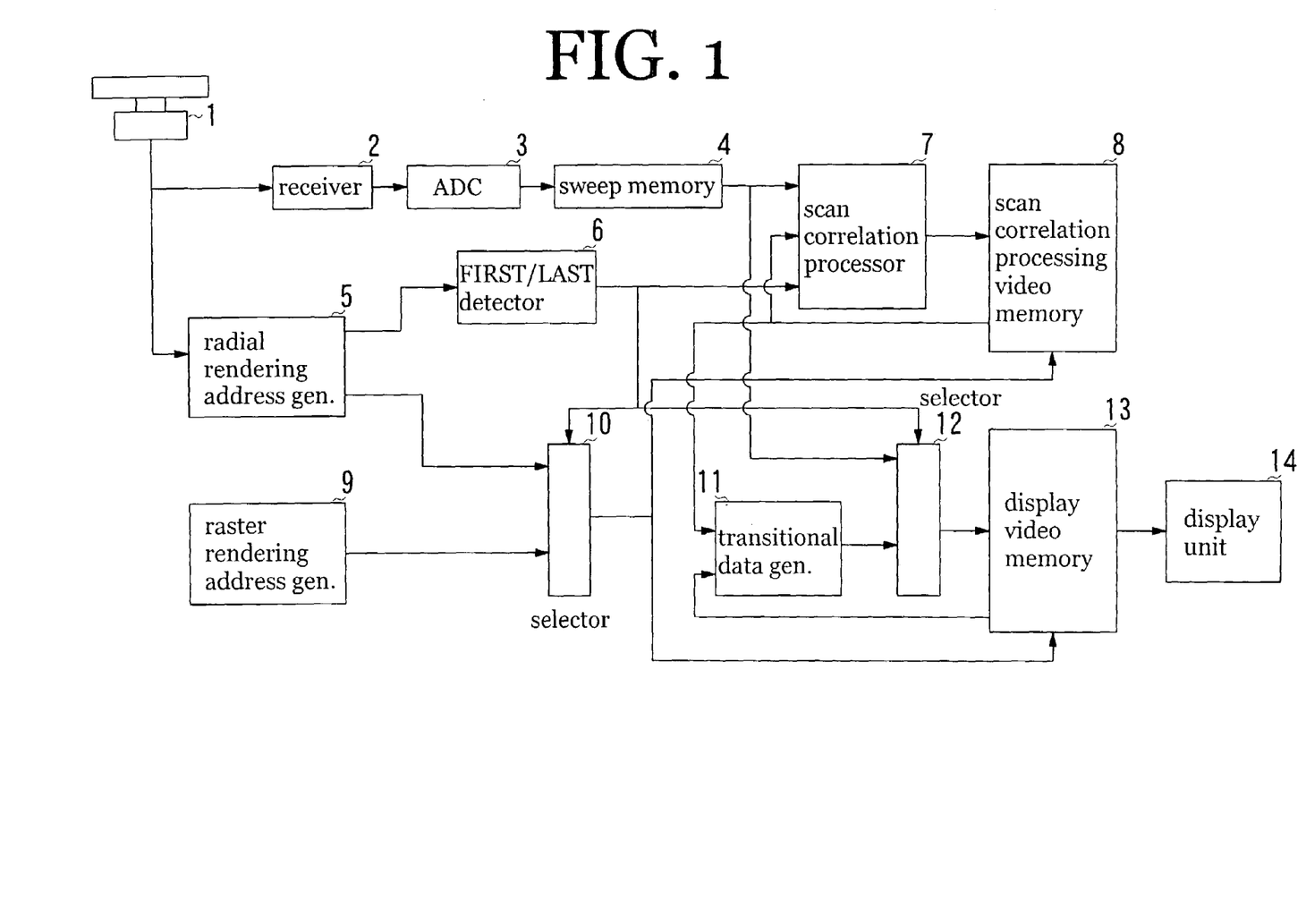
FIG. 1 is a block diagram showing the configuration of the main part of a radar device according to a first embodiment.

FIG. 1 is a block diagram showing the configuration of the main part of the radar device according to this embodiment.

While rotating in the horizontal plane at a predetermined rotation period, a radar antenna 1 sends out pulses of radio waves and receives the radio waves reflected by a target in a polar coordinate system, at a predetermined send/receive period, and it then outputs a received signal to a receiver 2, and outputs sweep angle data to a radial rendering address generator 5. The receiver 2 detects and amplifies the received signal from the radar antenna 1, and outputs this signal to an A/D converter 3. The A/D converter 3 converts this analog received signal into a digital signal (received data) constituted by a plurality of bits. A sweep memory 4 stores the digitized received data for one sweep in real time, and outputs this data for one sweep to a scan correlation processor 7 before received data obtained by the next transmission is written again.

The radial rendering address generator 5 generates addresses specifying pixels in the video memory, arranged in a corresponding Cartesian coordinate system, from the antenna angle θ (taking a predetermined direction, for example, the heading direction of a ship, as a reference) and the read-out position r of the sweep memory 4, taking the sweep rotation center as the start address and going around from the center. FIG. 2 shows the relationship between the polar coordinate system and the Cartesian coordinate system. As shown in FIG. 2, when the center address of sweep is (Xs, Ys), r is the distance from the center, and θ is the angle of sweep (of the radar antenna 101), the address (X, Y) specifying the pixel in the video memory can be expressed by the following equations:

$X = Xs + r \cdot \sin\theta$ $Y = Ys + r \cdot \cos\theta$

Specifically, the radial rendering address generator 5 is constructed by hardware that performs operations in accordance with the above equations.

It should be noted that the heading direction, the speed, the latitude and longitude, and the like of the own ship are input into the radial rendering address generator 5, thereby performing an address generation process in which the attitude and movement amount of the own ship are stabilized.

The FIRST/LAST detector 6 detects the timing at which, in one sweep rotation (of the radar antenna 1), that sweep has first accessed or last accessed each pixel in the Cartesian coordinate system in each of the video memories 8 and 13 that has been set by the radial rendering address generator 5, and feeds one of the timings to the scan correlation processor 7 and to selectors 10 and 12. Since it is necessary to limit the update of each pixel in the scan correlation processing video memory to only once per sweep rotation, a FIRST signal or a LAST signal is used as this timing.

As described above, since the update of pixels needs to be performed only once per sweep rotation, it is sufficient that either one of the FIRST detection or the LAST detection is performed, so that the following description illustrates a case where the FIRST detection is performed. Hereinafter, a signal that is output at the FIRST timing is referred to as "FIRST signal".

Based on the FIRST signal that is input from the FIRST/LAST detector 6, the scan correlation processor 7 performs a scan correlation process using the received data input from the sweep memory 4 and the image data stored in the later-described scan correlation processing video memory 8 of one sweep rotation before, and lets the scan correlation processing video memory 8 store the resulting data again.

When the received data input from the sweep memory 4 is taken as N(t), and the scan correlated image data at the pixel position corresponding to that received data that has been obtained in the previous rotation and input from the scan correlation processing video memory 8 is taken as W(t−1), this scan correlation process calculates the scan correlated image data W(t) obtained in the current rotation using the following equation:

$$W(t)=\alpha \cdot N(t)+\beta \cdot W(t-1)$$

where $\alpha$ and $\beta$ are any suitable numbers.

This process is continuously performed, and the scan correlated image data is updated correspondingly, as necessary. Then, by setting the values of $\alpha$ and $\beta$ to predetermined values, it is possible to highlight received data from a desired target and to suppress other targets or unnecessary components.

The scan correlation processing video memory 8 has sufficient capacity to store received data (scan correlated image data) for one sweep rotation (of the radar antenna 1), and it feeds back the correlated image data obtained one rotation before to the scan correlation processor 7 for the purpose of scan correlation processing, and outputs that data to a transitional data generator 11.

Figure 3:
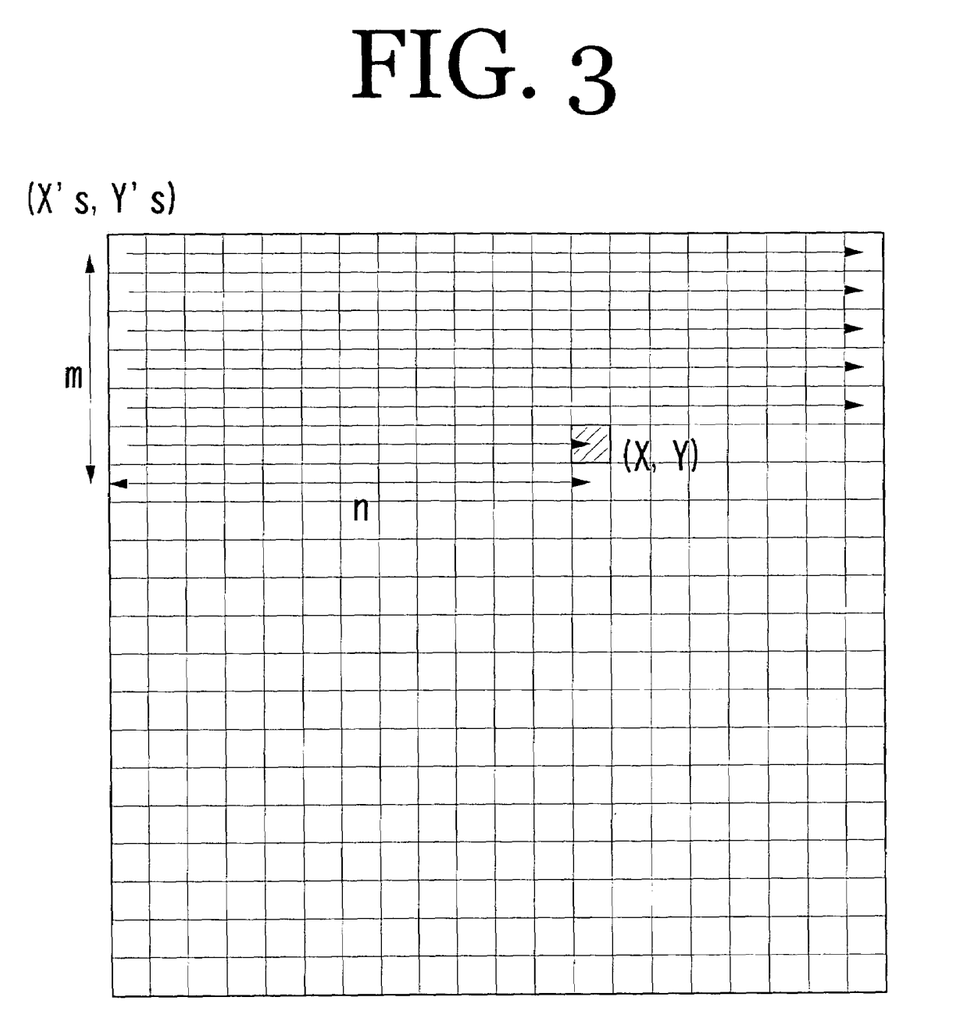
FIG. 3 is a diagram illustrating a raster rendering address.

The raster rendering address generator 9 generates addresses of pixels in the Cartesian coordinate system on the display video memory 13, as shown in FIG. 3. In FIG. 3, X's and Y's represent the coordinates of the start point, m represents the number of pixels in the Y direction on the display video memory 13, counted from the raster address start point, and n represents the number of pixels in the X direction on the display video memory 13, counted from the raster address start point, and the address (X, Y) of each pixel on the display video memory 13 can be expressed by the following equations:

$$X=X's+n$$

$$Y=Y's+m$$

Input into the selector 10 are the FIRST signal from the FIRST/LAST detector 6, the radial rendering address from the radial rendering address generator 5, and the raster rendering address from the raster rendering address generator 9. If the FIRST signal is input (FIRST=1), then the selector 10 outputs the radial rendering address to the scan correlation processing video memory 8 and to the display video memory 13, in order to perform radial rendering of the received data. If the FIRST signal is not input (FIRST=0), it then outputs the raster rendering address to the scan correlation processing video memory 8 and to the display video memory 13, in order to perform raster rendering of the scan correlated data.

Figure 4:
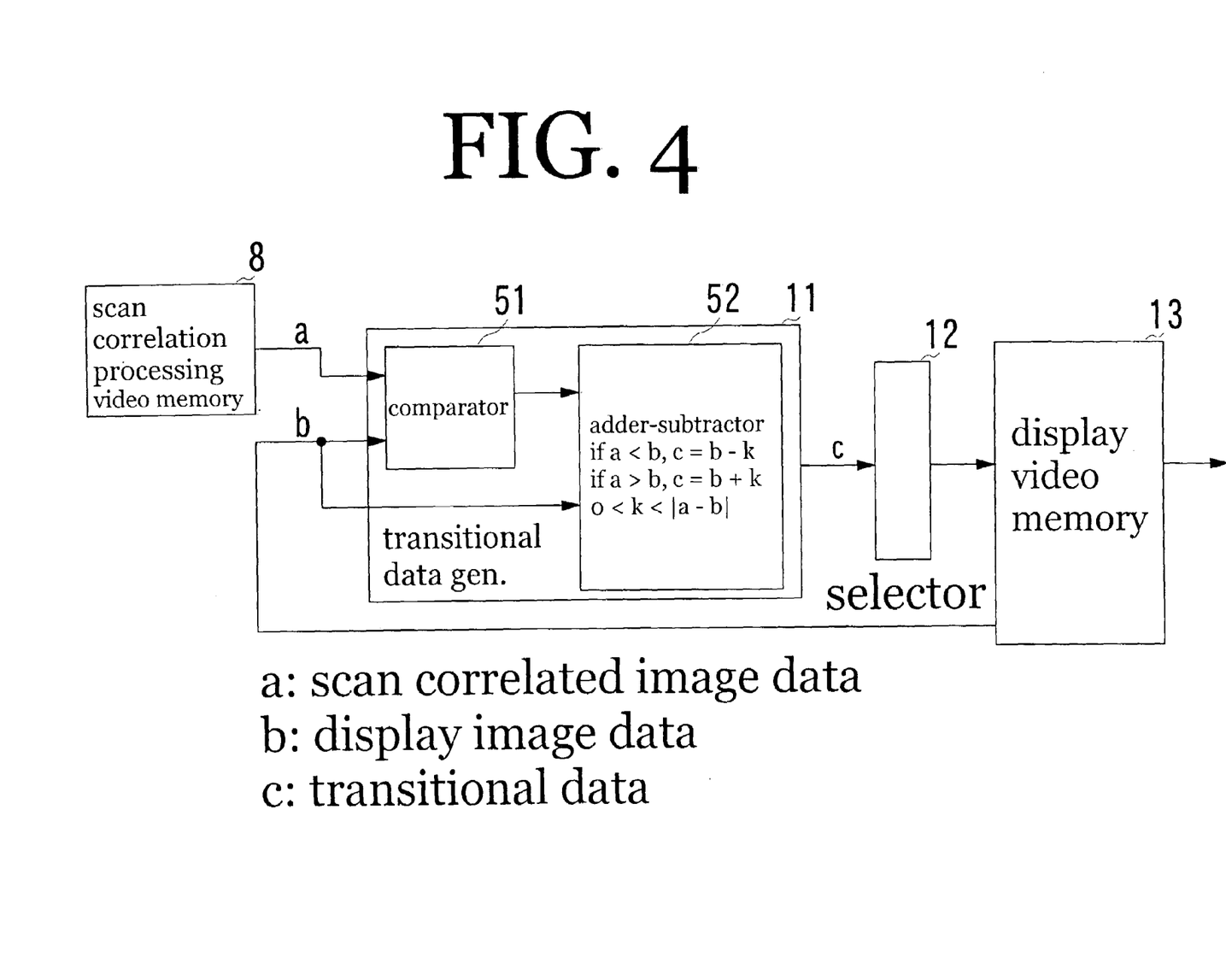
FIG. 4 is a diagram illustrating the operation of a transitional data generator.

As shown in FIG. 4, the transitional data generator 11 includes a comparator 51 and an adder-subtracter 52, and it compares the scan correlated image data a that is input into the comparator 51 from the scan correlation processing video memory 8 with the display image data b that is stored in the later-described display video memory 13 and that is fed back, and outputs an intermediate value k (0<k<|b−a|) between the absolute value of the difference between a and b |b−a| and "0" to the adder-subtracter 52. Into the adder-subtracter 52, the value k that has been input and the display image data b are input, and the adder-subtracter 52 performs addition/subtraction on the display image data b and the value k using the following equations, and outputs the resulting transitional data c to the selector 12.

Here, the above-noted addition/subtraction performs the calculation: c=b−k when a (scan correlated image data)<b (display image data), and performs the calculation:

$$c=b+k$$

when a (scan correlated image data)>b (display image data).

This calculation is repeatedly performed with a predetermined period, and the display image data becomes gradually closer to the scan correlated image data each time the calculation is repeated.

It should be noted that although k is determined by b and a in the foregoing description, k may also be set to a predetermined value (e.g., "1") in advance.

Input into the selector 12 are the received data from the sweep memory 4, the transitional data from the transitional data generator 11, and the FIRST signal from the FIRST/LAST detector 6, and the selector 12 outputs the received data to the display video memory 13 if the FIRST signal is input (FIRST=1), and outputs the transitional data to the display video memory 13 if the FIRST signal is not input (FIRST=0).

For example, when the rotation speed of the radar antenna 1 is 24 rpm, the number of radial pixels on one sweep is 512, the number of pixels in the display video memory 13 (the number of raster rendered pixels) is 1024×1024=1048576, and the rendering speed per pixel is 0.1 μsec., then the number of pixels that are rendered in one antenna rotation at the timing at which the FIRST signal is input (the number of radially rendered pixels) will be at most 512×512×π=823550 pixels, since the number of radial pixels on the sweep is 512. The time required to render all of these is 823550×0.1 (μsec.)=0.08 sec. The rotation speed of the antenna is 24 rpm, hence the rotation period of the antenna is 2.5 sec., so that it is possible to use at least 2.5−0.08=2.42 sec. to render the transitional data. Since the number of rendered pixels (the number of raster rendered pixels) of the transitional data is 1048576, it takes about 1048576×0.1 (μsec.)=0.1 sec. to render all the pixels, and therefore it is possible to render the transitional data for 2.42 (sec.)/0.1 (sec.)=approx. 24 times in one antenna rotation. That is, it is possible to generate the transitional data of each pixel for about 24 times during one antenna rotation.

It should be noted that although in practice it is necessary to take into consideration a display access time to the video memory to display the transitional data on the display unit, the time required for display access has been omitted in the above-described calculation.

The display video memory 13 has sufficient capacity to store image data (received data and transitional data) for one sweep rotation (of the radar antenna 1), and feeds back the stored image data to the transitional data generator 11. Furthermore, in the display video memory 13, the image data is rendered with the radial rendering address when the FIRST signal is input into the selector 12, whereas the image data is rendered with the raster rendering address in the time period in which the FIRST signal is not input into the selector 12. Thereafter, when the display unit 14 performs scanning under the control of the display control portion (not shown), the display video memory 13 outputs the rendered image data as display data in synchronization with this scanning.

Here, the transitional data generator 11, the selector 12 and the display video memory 13 constitute the transitional image data generation section of the present invention.

With such a configuration, it is possible to output the received data and the transitional data in parallel with each other during one antenna rotation, and to let the transitional data gradually become closer to the scan correlated image data than to the received data.

Figure 5:
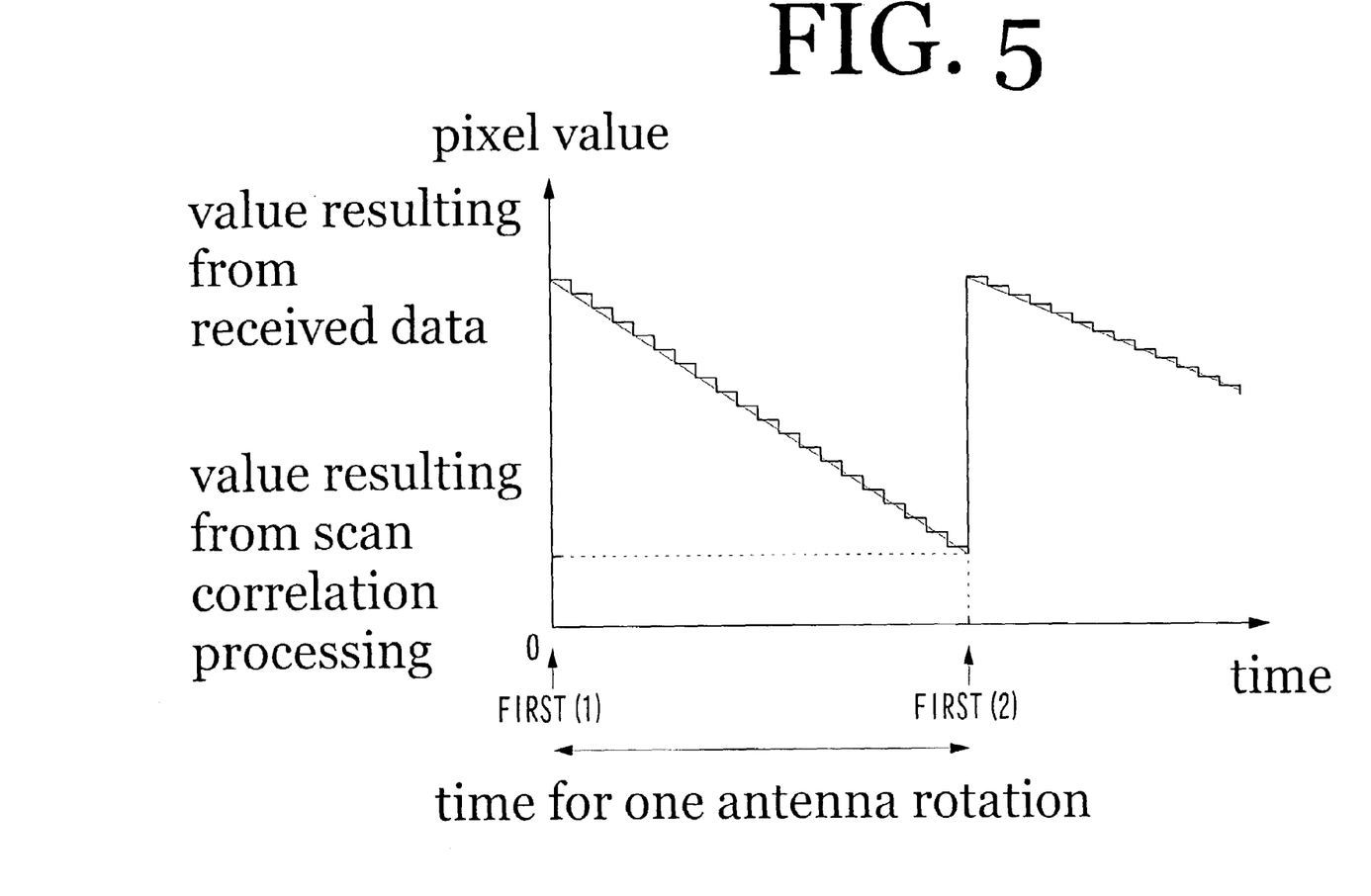
FIG. 5 is a diagram showing a temporal transition of the pixel value of pixel data in a display video memory.

For example, as shown in FIG. 5, a change in the pixel value of a pixel for which a target has been detected is radially rendered with a pixel value in accordance with the intensity of the received data at the timing at which a given FIRST signal is input. Thereafter, raster rendering is repeatedly performed with the gradually changing pixel values of that pixel in the scan correlated image data for the current rotation, which is constituted by that received data and the scan correlated image data obtained one rotation before. If a target is detected again at the timing at which the next FIRST signal is input, then radial rendering is performed with a pixel value in accordance with the intensity of the received data.

Figure 6:
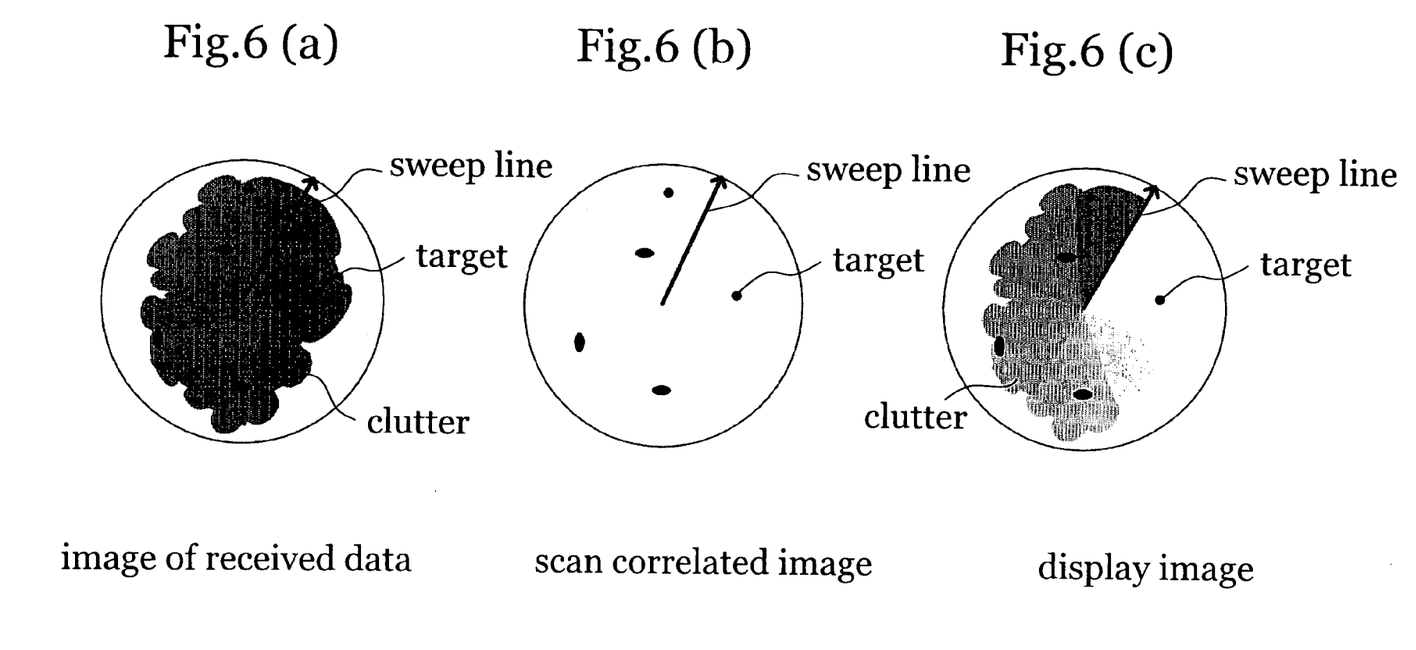
FIG. 6 shows diagrams illustrating display images when the configuration according to the first embodiment is used.

With this configuration, it is possible to obtain a display image as shown in FIG. 6(c).

FIG. 6(a) is a display image constituted only by the received data, and FIG. 6(b) is a display image constituted only by the scan correlated image data. FIG. 6(c) is a display image obtained with the radar device described in this embodiment.

As shown in FIG. 6(c), images resulting from the received data and scan correlated images are present on the display image, and the images resulting from the received data gradually change into the images resulting from the scan correlated image data, in a direction opposite to the direction of sweep rotation.

Thus, the operator can observe both images that have not been subjected to scan correlation processing and images that have been subjected to scan correlation processing.

For example, it is possible to capture another ship moving at high speed in an image resulting from the received data, from which the current state of the surroundings can be confirmed, and to capture a stationary object such as a buoy in an image that has been subjected to scan correlation processing. Furthermore, clutter such as sea clutter is displayed in an image resulting from the received data, but not in an image that has been subjected to scan correlation processing, so that it is possible to use this as a measure to distinguish between clutter such as sea clutter and a desired target.

Furthermore, since the received image data and the scan correlated data are concurrently displayed, it is possible, even when the adjustment of GAIN, STC, FTC and the like is performed, to promptly confirm the adjustment result, facilitating the adjustment operation.

Moreover, since images resulting from the received image data and images resulting from the scan correlated image data can be viewed substantially concurrently, it is not necessary to switch between images to obtain an optimum image, and to wait until the result of processing is displayed after the switching.

Furthermore, since an image is displayed in which an image resulting from the received image data gradually changes into an image resulting from the scan correlated image data, the operator can acquire an increased amount of information. In particular, by observing a changing image, it is possible to prevent cases where the image of a desired target is deleted because the details of the scan correlation process are inappropriate.

Further, since images resulting from the received image data and images resulting from the scan correlated image data can be viewed substantially concurrently, it is possible to readily and promptly confirm whether the set details of the scan correlation process are appropriate.

It should be noted that in this embodiment the scan correlation processing video memory and the display video memory are constituted by separate physical memories, but they may be configured in the same physical memory. This makes it possible to decrease the number of the structural components of the radar device, reducing the cost of the device.

Next, a radar device according to a second embodiment will be described with reference to FIG. 7.

Figure 7:
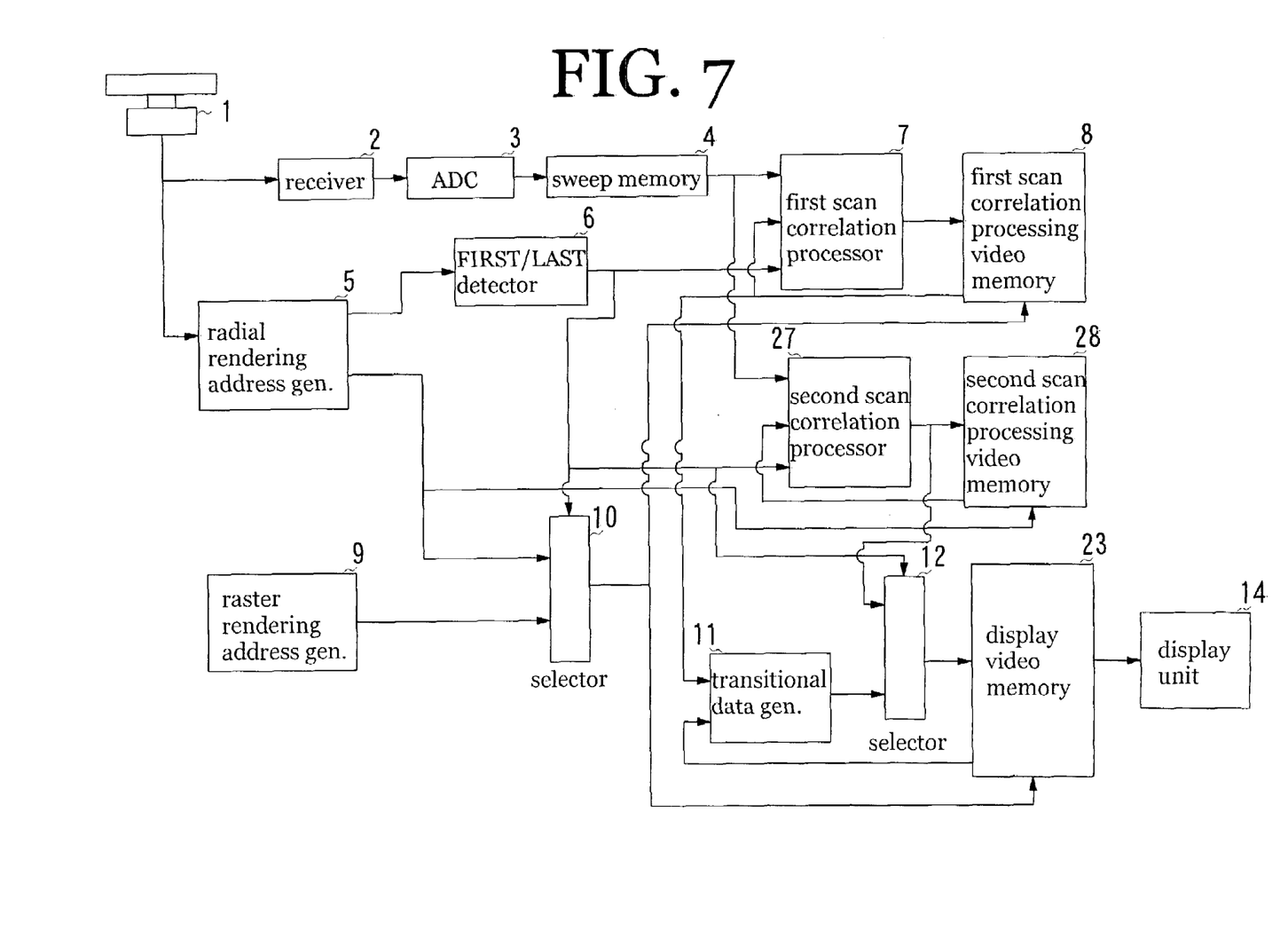
FIG. 7 is a block diagram showing the configuration of the main part of a radar device according to a second embodiment.

FIG. 7 is a block diagram showing the configuration of the main part of the radar device according to this embodiment. In the drawing, the structural components that are the same as those of the radar device shown in FIG. 1 are denoted by the same reference numerals, and the description of the components with the same configuration and operation has been omitted. It should be noted that also in this embodiment a case will be described where the FIRST signal is used.

Based on the FIRST signal that is input from the FIRST/LAST detector 6, a second scan correlation processor 27 performs a scan correlation process using the received data that is input from the sweep memory 4 and the image data that has been obtained one sweep rotation before and that is stored in a later-described second scan correlation processing video memory 28, and outputs this to the selector 12. The radial rendering address is input from the radial rendering address generator 5 into the second scan correlation processing video memory 28, which stores data that is output from the second scan correlation processor 27, and feeds this back to the second scan correlation processor 27. Here, the operation of the second scan correlation processor 27 is the same as that of the scan correlation processor 7 described in the first embodiment, except that the scan correlation processing video memory 8 has been replaced with the second scan correlation processing video memory 28. Further, the details of the correlation process of the first scan correlation processor 7 and those of the second scan correlation processor 27 were made different by varying the coefficients $\alpha$ and $\beta$.

The second scan correlated image data from the second scan correlation processor 27, the transitional data from the transitional data generator 11 and the FIRST signal from the FIRST/LAST detector 6 are input into the selector 12, and the selector 12 outputs the second scan correlated data to the display video memory 23 if the FIRST signal is input (FIRST=1), and outputs the transitional data to the display video memory 23 if the FIRST signal is not input (FIRST=0).

The display video memory 23 has sufficient capacity to store image data for one sweep rotation (of the radar antenna 1), and feeds back the stored image data to the transitional data generator 11. Furthermore, in the display video memory 23, the image data is rendered with the radial rendering address when the FIRST signal is input into the selector 12, whereas the image data is rendered with the raster rendering address in the time period in which the FIRST signal is not input into the selector 12. Thereafter, when the display unit 14 performs scanning under the control of the display control portion (not shown), the display video memory 23 outputs the rendered image data as display data in synchronization with this scanning.

Here, the above-described transitional data generator 11, selector 12 and display video memory 23 correspond to the transitional image data generation section of the present invention.

With such a configuration, when the first scan correlation process and the second scan correlation process are displayed, the second scan correlated image data is rendered with the radial rendering address at the timing at which the FIRST signal is input, and the transitional data, which gradually becomes closer to the first scan correlated image data, is rendered with the raster rendering address at all other times.

Figure 8:
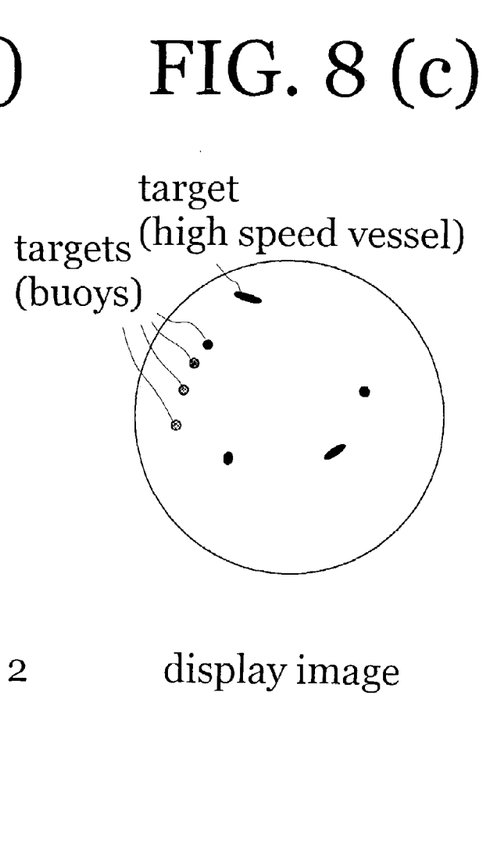
FIG. 8 shows diagrams illustrating display images when the configuration according to the second embodiment is used.

FIG. 8 shows an exemplary display image formed with the configuration of this embodiment.

FIG. 8(*a*) shows only the first scan correlated image data, FIG. 8(*b*) shows only the second scan correlated image data, and FIG. 8(*c*) shows a display image that can be obtained with the configuration according to this embodiment. Here, a case is described where the first scan correlation process is set so as to sense quickly moving targets (e.g. high-speed vessels), and the second scan correlation process is set so as to sense stationary targets (e.g., buoys).

As shown in FIG. 8(*c*), in the case of using the configuration according to this embodiment, the images of buoys, which are stationary targets, are observed first, and thereafter, the image of a high-speed vessel, which is a quickly moving target, is displayed concurrently with the gradual disappearance of the images of the buoys.

Moreover, since images resulting from the first scan correlated image data and images resulting from the second scan correlated image data can be viewed substantially concurrently, it is not necessary to switch between images to obtain an optimum image, and to wait until the result of processing is displayed after the switching.

Furthermore, since an image is displayed in which an image resulting from the second scan correlated image data gradually changes into an image resulting from the first scan correlated image data, the operator can acquire an increased amount of information. In particular, by observing a changing image, it is possible to prevent cases where the image of a desired target is deleted because the details of the scan correlation process are inappropriate.

It should be noted that in this embodiment, since β is set such that β=0 in the first scan correlation process, the first scan correlation processor outputs the image data to the transitional data generator, without performing scan correlation processing. Accordingly, it is possible to output image data in which a second scan correlated image gradually changes to raw received data.

Furthermore, in this embodiment, the first scan correlation processing video memory and the display video memory are constituted by separate physical memories, but they may be configured in the same physical memory. This makes it possible to decrease the number of the structural components of the radar device, reducing the cost of the device.

In each of the embodiments described above, the generation and the rendering of the transitional data that is to be rendered are performed pixel by pixel, but the generation and the rendering also may be performed on a plurality of pixels at a time by performing batch processing on transitional data sets having consecutive addresses. With this configuration, it is possible to reduce the time required for generating and rendering the entire transitional data, thus further increasing the number of the transitional data sets that are generated and rendered in one antenna rotation.

In each of the embodiments described above, a description was given of a radar device, but the above-described configurations can be applied to a device with which received data obtained in a polar coordinate system is displayed in a Cartesian coordinate system, and can be expected to achieve corresponding effects.

In each of the embodiments described above, the compass, the ship speed and the latitude/longitude are not input for the sake of simplicity, but it is desirable in an actual device that scan correlation processing is performed in a state in which the bearing and the position are stabilized with these signals. However, the display video memory may be operated in a relative motion such as head-up, course-up or north-up, depending on the purpose of the operator. In this case, the scan correlation processing video memory and the display video memory use different rendering criteria, and therefore, a dedicated raster rendering address generator is provided for each of them. Then, by setting the proceeding direction of the rendering address in these raster rendering address generators to a desired angle, it is possible, even if the scan correlation processing video memory and the display video memory are in different modes, to make their pixels correspond to each other.

INDUSTRIAL APPLICABILITY

The present invention can be applied to radar devices, sonar devices and the like that convert sensed signals received in a polar coordinate system into a Cartesian coordinate system, and output this to a display unit, and in particular, it can be applied to devices that output the result of scan correlation processing on sensed targets.

The invention claimed is:

1. A radar or sonar device comprising:
   a scan correlation processing section for performing correlation processing between pixel data of current received data obtained by sweep rotation and stored previous data of the pixel data and generating scan correlated data; and
   a transitional image data generating section into which the received data and the scan correlated data are input, and which outputs the received data as image data at a predetermined timing in one sweep rotation, generates transitional data that represents an intermediate value between the received data and the scan correlated data, based on the received data and the scan correlated data, and outputs the transitional data as image data, at a time period other than the predetermined timing.

2. A radar or sonar device comprising:
   two scan correlation processing sections for performing correlation processing between pixel data of current received data obtained by sweep rotation and stored previous data of the pixel data and generating scan correlated data; and
   a transitional image data generating section into which first scan correlated data generated by a first one of the scan correlation processing sections and second scan correlated data generated by a second one of the scan correlation processing sections are input, and which outputs the second scan correlated data as image data at a predetermined timing in one sweep rotation, generates transitional data that represents an intermediate value between the first and the second scan correlated data, based on the first and the second scan correlated data, and outputs the transitional data as image data, at a time period other than the predetermined timing.

3. The radar or sonar device according to any one of claims 1 to 2, wherein the transitional image data generation section comprises an adder-subtracter or a multiplier, and addition/subtraction or multiplication is used for calculation for generating the transitional data.

4. The radar or sonar device according to any one of claims 1 to 2, wherein the transitional image data generation section concurrently generates a plurality of sets of the transitional data.

* * * * *